April 23, 1968    R. C. FOLWEILER    3,379,054

TENSILE TEST APPARATUS

Filed Sept. 9, 1965    2 Sheets-Sheet 1

INVENTOR.
ROBERT C. FOLWEILER
BY
Weingarten, Drenbuch & Lahive
ATTORNEYS

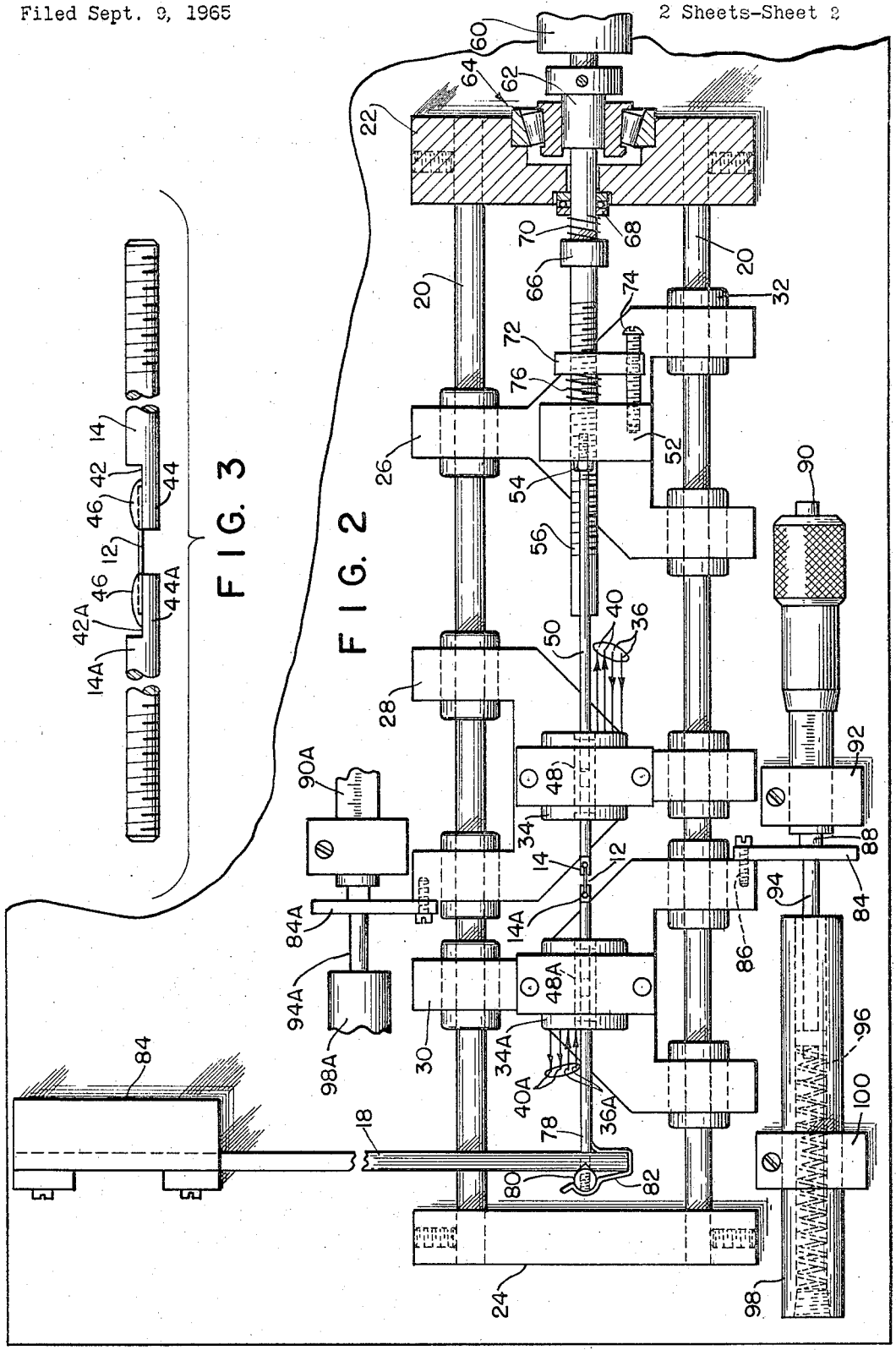

United States Patent Office 3,379,054
Patented Apr. 23, 1968

3,379,054
TENSILE TEST APPARATUS
Robert C. Folweiler, Bedford, Mass., assignor to Lexington Laboratories, Inc., Cambridge, Mass., a corporation of Massachusetts
Filed Sept. 9, 1965, Ser. No. 486,170
1 Claim. (Cl. 73—95)

ABSTRACT OF THE DISCLOSURE

Apparatus for testing the tensile properties of relatively fine, short filaments or "whiskers" in which the specimen under test is held between a pair of movable supports. One support is connected to a drive mechanism, while the other is attached to a load bar to stress the sample in tension. Transducers are used to sense movements of the supports and means are provided to convert the outputs of the transducers to indications of load and elongation.

---

The present invention relates in general to apparatus for quantitatively determining specific mechanical properties of materials, and more particularly to improved test equipment for precisely measuring and evaluating the axial tensile characteristics of relatively fine, short filaments of exceptionally high tensile strength. Such filaments, commonly known as "whiskers," are being used as additives to enhance the strength of various materials, and as whisker formation technoligy has advanced, a simultaneous need has developed for reliable but economical test equipment.

As an aid to an understanding of the problems inherent to test equipment specifically adapted for this purpose, some generalized comments on the physical characterisics of the whiskers themselves would be appropriate. A typical whisker may be a grown refractory crystalline fiber of aluminum oxide, silicon dioxide or silicon nitride of random length and diameter, a representative specimen being an aluminum oxide whisker having the following physical characteristics: diameter in the range of 1 to 10 microns, overall length in the range of 0.05 to 0.5 inch, axial tensile strength at break in the range of 0.1 to 2.0 million p.s.i., and a strain at break of up to 3%. Actual elongation of a whisker specimen is typically only about 0.010 inch. Despite the extraordinary axial strength noted above, whiskers such as these are quite fragile and must be tested in a manner to avoid significant bending and torsional stresses.

As should be apparent from the foregoing, apparatus previously developed and extensively used to measure the tensile strength and strain of natural and plastic fibers used in fabric manufacture are of little value in solution of the testing problem under discussion. The available test machines ordinarily accept a pre-cut uniform length of fiber, and initial bending and torsional stresses are relatively unimportant. With rubber, plastic and natural fibers, elongation is large and thus readily measured by conventional gauges; moreover, no special or unusual problems are encountered in gripping the sample ends while mounting or during application of test loads.

By contrast, due to the parameters involved, apparatus for the measurement of the tensile properties of whiskers must combine exceptional accuracy and sensitivity in the measurement of the relatively small applied loads and the correspondingly small specimen elongations. The test equipment must within reasonable tolerance accommodate samples of random lengths and diameters and, furthermore, must permit the positioning and gripping of the whisker sample in an initially stress-free condition without the application of bending or torsional moments which would distort the data obtained. Mechanical hysteresis in the sample support and gauging systems must be avoided to ensure reliability and reproducibility of test results.

It is accordingly a principal object of the present invention to provide tensile testing apparatus particularly suited to the testing of whiskers which overcomes the limitations and disadvantages of test apparatus heretofore available in the prior art.

Another object of the invention is to provide a tensile tester combining sturdy, economical construction with means for accurately measuring the stress-strain characteristics of a filamentary sample of extraordinarily high tensile strength.

Another object is to provide a tensile tester suitable for the testing of extremely short samples exhibiting a very low percentage elongation at break.

Another object of this invention is to provide a tensile tester wherein the sample grips will securely support a specimen of extremely fine diameter during load application, but will not stress the specimen prior to the commencement of test.

Further objects and advantages of the present invention will become apparent from the following description when read in conjunction with the accompanying drawings in which:

FIG. 2 is a top view of the tensile test apparatus shown in FIG. 1;

FIG. 3 is an elevational view of a specimen whisker and the whisker end supports of the tensile test apparatus.

Figure 1:
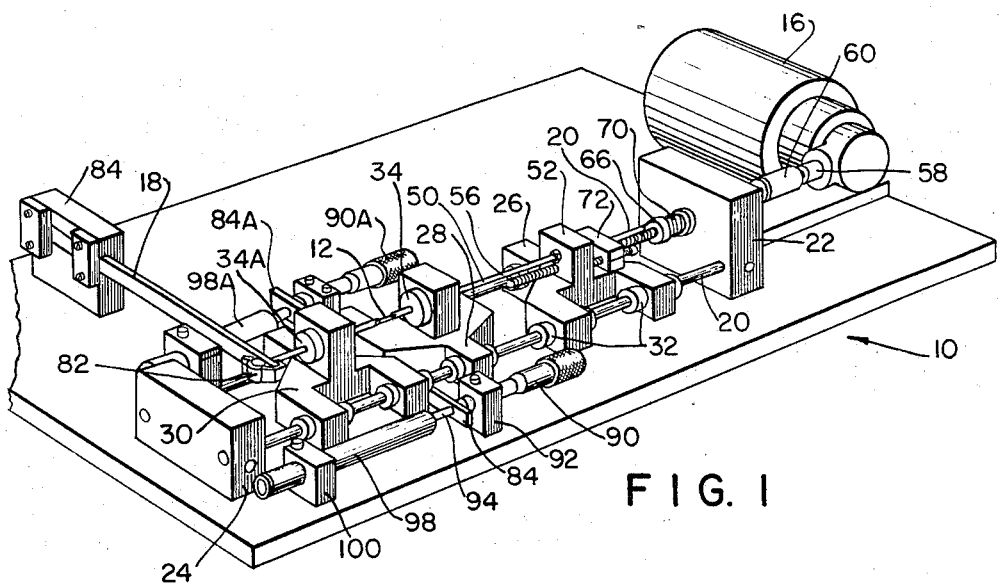
FIG. 1 is a perspective view of the novel tensile test apparatus.

With reference now to the drawings and more particularly to FIGS. 1 and 2 thereof, the tensile test apparatus of this invention is arranged in generally axial fashion upon the upper surface of a sturdy supporting frame on base plate 10.

The specimen under test is shown as an extremely fine diameter, relatively short whisker 12 which is stressed as the supports 14, 14A therefor are drawn axially to the right (as viewed in the drawings) by electric motor 16 against the resistance imposed by a precision, blendable load-bar 18. The exact manner in which this axial force is applied, controlled and gauged will now be described in detail.

As shown in FIGS. 1 and 2, a pair of precision, parallel traverse rails 20 are rigidly supported by a pair of opposed end blocks 22 and 24, which in turn are firmly secured to base 10. Three Y-shaped yokes 26, 28 and 30 are slidably mounted by precision sleeve bearings 32 permitting smooth, substantially frictionless longitudinal movement of these yokes along traverse rails 20. The tails of the outer yokes 26 and 30 are positioned to ride on one of the traverse rails, while the tail of the inner or middle yoke 28 is positioned to ride on the other of the traverse rails.

Yokes 28 and 30 are similar in construction, and each rigidly and axially supports a differential transducer 34, 34A, respectively; each of the differential transducers 34, 34A are complete, self-contained units energized through pairs of input wires 36, 36A, respectively, from a DC power source 38 (shown in FIG. 4), the outputs thereof being derived on wire pairs 40, 40A, respectively.

The ends of the whisker 12 are secured to the opposed flat surfaces 42, 42A of the hemi-cylindrical tips 44, 44A of supports 14, 14A by cement beads 46, such as an epoxy resin. The cylindrical ends of each support 14, 14A are screwed into respective movable sensor elements 48, 48A located within transducers 34, 34A.

One end of sample support 14 is threaded into sensor element 48, as described above. The opposite end of sensor element 48 threadably connects to shaft 50, which in turn is screwed into the cross-head 52 of yoke 26 and secured thereto by locknut 54 for precision movement therewith. Cross-head 52 is provided with internal thread which freely but precisely engages the threaded end of drive screw 56. Variable speed motor 16 which rotates drive screw 56 is equipped with an "on-off" switch and a speed selector switch (neither shown) for adjusting the driving speed through reduction gear 58 within wide limits. The output shaft of reduction gear 58 is attached to the drive screw 56 through a slip clutch 60 as a safety precaution to prevent severe overloads.

Backlash preventive arrangements are furnished for drive screw 56 to retain the desired precision of motion. Thus, a first anti-backlash arrangement precludes undesired longitudinal displacement of drive screw 56 in the direction of the sample, and includes a cooperative combination of a collar 62 secured on drive screw 56 supported, in turn, in thrust bearing 64, and a fixed collar 66, ball bearings 68 and a small compression spring 70. Another anti-backlash device comprises the combination of nut 72, threaded over drive screw 56 and secured to cross-head 52 by screw 74, and small compression spring 76 which exerts pressure between the opposed faces of cross-head 52 and the nut 72.

Turning now to the left-hand portion of the apparatus as viewed in the drawings, the sliding sensor 48A within transducer 34A receives sample support 14A at one end, as described above, and at the other end receives the threaded end of connecting rod 78. The opposite end of connecting rod 78 is also threaded and passes through a relatively larger opening in precision load bar 18, where it is engaged by cylindrical screw clamp 80. A V-shaped vertical groove is provided in the load bar 18 to rotatably receive screw clamp 80, while the latter is retained in a leaf spring 82. Load bar 18 is fastened to frame 10 by solid bracket 84.

The length of the bar 18 between its points of attachment to bracket 84 and connecting rod 78 is of sufficient magnitude that, for small displacements of the connecting rod 78, the path travelled by the clamp 80 is substantially parallel to the axis of the traverse rails 20; however, due to the pivotal nature of the attachment, flexing of the bar during the load cycle is readily accommodated.

Means are provided for adjusting and fixing the longitudinal positions of each of the yokes 28 and 30 along the traverse rails 20. Turning first to yoke 30, a positioning plate 84, secured to the yoke by screws 86 (one shown) extends perpendicularly outward of the axis of the traverse rails 20. The right-hand side of positioning plate 84 is firmly contacted by the adjustable pin 88 of micrometer 90 secured on the frame 10 by bracket 92. The left-hand side of positioning plate 84 is engaged by an end of a plunger 94 loaded by compression spring 96 within hollow cylinder 98, the latter being secured to frame 10 by bracket 100. Since yoke 30 is otherwise free to slide on traverse rails 20, adjustment of micrometer 90 will precisely and reproducibly fix the longitudinal position thereof. From FIGS. 1 and 2 it may be seen that yoke 28 may be longitudinally positioned in exactly the same manner by micrometer 90A acting against positioning plate 84A and plunger 94A extending from fixed cylinder 98A. The extent of yoke adjustment required and the purpose thereof will be described below.

The interaction of the various elements of the apparatus will become readily apparent from the following description of the operation of the apparatus in testing a typical whisker 11. Drive screw 56 is rotated to adjust the position of yoke 28 until the whisker 12 can be placed between supports 14 and 14A, with the ends of the whisker resting on the flat surfaces 42, 42A of the hemi-cylindrical tips 44, 44A, as shown in FIG. 3. Epoxy cement 46 is applied to the ends of the unstressed whisker 12 on flat surfaces 42, 42A and allowed to cure. The curing of the epoxy cement 46 may be accelerated by heat, as with a fine soldering iron or similar device, provided that the resulting temperature does not approach that which might injure or alter the characteristics of whisker 12.

With the whisker remaining in this unstressed condition the yokes 28 and 30 are then individually translated along the traverse rails 20 by adjustment of the micrometers 90 and 90A until the electrical outputs of the transducers 34, 34A are each zero. After selection of an appropriate motor speed, the motor 16 is turned on, which in turn causes rotation of the threaded end of drive screw 56 to draw the cross-head 52 of yoke 26 towards the right as seen in FIGS. 1 and 2. Movement of the cross-head 52 to the right causes a similar movement of the rod 50, the sensor element 48, sample support 14 and the right end of the whisker 12. The movement of the left end of whisker 12 to the right is restrained by the combination of sample support 14A, sensor element 48A, connecting rod 78, and load bar 18.

Figure 4:
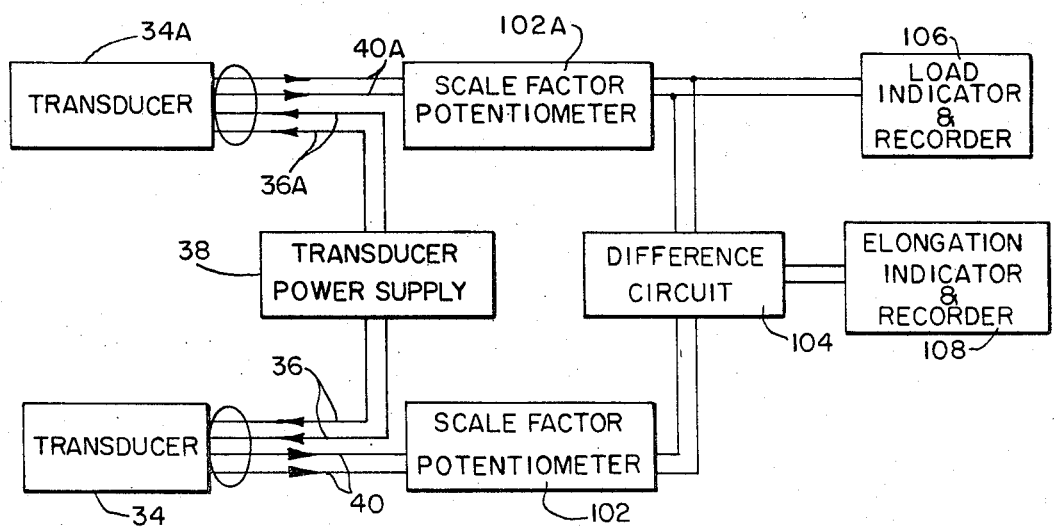
FIG. 4 is a block-schematic diagram of the electrical circuit for converting the transducer outputs to useful, visible data.

Axial motion of sensor elements 48, 48A provides outputs from the respective transducers 34, 34A and thereby causes current to flow in the respective pairs of output wires 40, 40A. As shown in FIG. 4, output pairs 40, 40A are connected to respective scale factor potentiometers 102, 102A for reasons to be discussed below. The outputs from the potentiometers 102, 102A are connected to a Difference Circuit 104, the output of potentiometer 102A also being connected to a signal recording device 106 designated as the Load Indicator and Recorder which provides a chart or comparable continuous indication of the output of potentiometer 102A. Difference Circuit 104 is arranged to provide an Elongation Recorder 108 an electrical impulse which is the difference between the signal outputs of the potentiometers 102 and 102A. The output of the potentiometer 102 will always be greater than the output of potentiometer 102A because for any longitudinal movement $x$ of the sensor 48A in transducer 34A, the sensor 48 in transducer 34 will move $x + \Delta x$ where $\Delta x$ represents the elongation of the whisker 12 during test.

Load Recorder 106 and Elongation Recorder 108 may be independently calibrated to give readings in whatever units are most convenient for the test operator. For example, the Load Recorder 106 may be calibrated in pounds and the Elongation Recorder 108 may be calibrated in inches. These recorders may provide continuous chart outputs, as earlier noted, or may be simple indicating devices such as voltmeters.

Prior to use of the apparatus for testing, various elements thereof must be calibrated. As it is unlikely that equal displacements of the sensor elements 48 and 48A will generate precisely the same electrical outputs by transducers 34 and 34A, respectively, potentiometers 102 and 102A are adjusted independently as necessary to provide equivalent potentiometer outputs for equivalent displacements of the sensors 48, 48A. As movement of the sensors relative to the respective transducers is the equivalent of movement of the transducer-carried yokes relative to the fixed frame 10, a simple procedure for calibrating the transducer outputs involves adjustment of micrometers 90, 90A before the sample is stressed to displace both yokes 28 and 30 equal distances along traverse rails 20, while adjusting potentiometers 102 and 102A to provide a zero reading on the Elongation Recorder 108.

Calibration of the Load Recorder 106 to determine the proportionality between a force applied to the whisker specimen and the corrected output of the transducer 34A (that is, the output from scale factor potentiometer 102A) is preferably performed by loading the support 14A with predetermined weights.

Transducers of the type designated by reference numerals 34, 34A and suitable for use in the instant invention are commercially available. Such a transducer contains coils, energized by an oscillator (self-contained except for a D.C. input) which provide an electrical D.C. output proportional in magnitude and sign to the axial displacement of the internal movable sensor element rod perpendicular to the coils. Each such sensor element is available with internal threads at both ends to receive the threaded rods shown in the drawings. For reference purposes it should be observed that a transducer of the type described immediately above is available as Model No. 7DCDT–050 from the Sanborn Division of the Hewlett-Packard Company.

After calibration, and in operation of the tensile tester of this invention, the conventional stress-strain parameters are available for each sample under test. The length of the whisker sample 12 between the hemi-cylindrical ends of the sample holders 14, 14A may be measured by any convenient rule and whisker diameter may be measured by optical means. At any point during the elongation of the whisker sample by operation of motor 16, the charts obtained from recorders 106 and 108 will display the total load applied, as for example, in pounds, and the total elongation in inches, or if desired, in microinches. Strain may be computed as the ratio of the elongation to the initial unstressed free length. If the test is destructive of the sample, then at the point where the whisker 12 breaks in tension, the Load Recorder 106 will show a distinctive and sharp reduction (as the load obviously drops to zero) from which the breaking load may easily be read. The maximum elongation may at this point be read from the Elongation Recorder 108 for use in the computations described above.

For whisker samples as described in the introduction to the specification, it has been found that the motor 16 is preferably adjusted to provide longitudinal movement of the cross-head 52 to the right (as viewed in FIGS 1 and 2) at a rate of from 0.02–0.40 inch per minute. The actual rate used for test purposes will, of course, be dependent upon the standards established for particular sample compositions, sample lengths and sample diameters.

Although hemi-cylindrical grips have been shown as in FIG. 3 for retaining the sample to be stressed, other gripping devices may be utilized in a test procedure. For example, the sample rods 14, 14A shown in FIG. 3 may be replaced with similarly threaded shafts containing axial capillary bores into which the whisker is inserted and secured with epoxy cement. Otherwise, the test apparatus remains the same.

While the above apparatus is presently deemed the preferred embodiment of my invention, it will be obvious to those skilled in the art that there are other changes and modifications which may be made therein without departing from the inventive concept. Accordingly, the appended claim is intended to cover all such changes and modifications that fall within the true spirit and scope of the invention therein defined.

What is claimed is:
1. Apparatus for testing the tensile properties of a short whisker of high tensile strength comprising
a supporting frame;
a plurality of traverse rails supported by said frame in fixed parallel disposition;
first, second and third yokes adapted to ride in consecutive order on said rails exclusively in a direction parallel to the aixs of said rails;
micrometer means for adjusting the positions of said first and second yokes along said rails;
first and second differential transducers supported by said first and second yokes, respectively; each of said transducers being adapted to sense displacement of a movable element thereon in a direction parallel to the axis of said rails, and provide an electrical output proportional thereto;
a first rod axially substantially parallel to the axis of said rails, said first rod having one end secured to the movable element of said first transducer for movement therewith and a second end;
a load bar having one end fixedly attached to said frame to provide a longitudinal axis substantially perpendicular to the axis of said rails, and having a displaceable end pivotally attached to the second end of said first rod for movement therewith; the length of said load bar between such attachments being of sufficient magnitude that a small movement of the displaceable end of said load bar is substantially parallel to the axis of said rails;
a second rod axially parallel to the aixs of said rails, connecting the movable element of said second transducer to said third yoke for movement therewith;
first and second whisker end support means supported in mutual end-to-end alignment parallel to the axis of said rails by the movable elements of said first and second transducers, respectively, for movement therewith;
differential transformer means adapted to sense the electrical outputs of said first and second transducers and provide an electrical indication of the difference between such electrical outputs;
means for forcibly displacing said third yoke along said rails, whereby displacement of said third yoke away from the whisker being tested acts through said second rod, the movable element of said second transducer and said second whisker end support means to move said whisker therewith, said whisker being partially restrained from moving therewith by the frame acting through said load bar, said first rod, the movable element of said first transducer and said first whisker end support means;
first and second indicating means responsive to the electrical output of said first transducer and the electrical indication of said differential transformer, respectively, wherein the electrical output of said first transducer is proportional to the load applied to the whisker during test and the electrical indication of said differential transformer is proportional to the elongation of the whisker during test.

References Cited

UNITED STATES PATENTS

| | | | |
|---|---|---|---|
| 2,065,359 | 12/1936 | Zechmeister | 73—95 |
| 2,420,654 | 5/1947 | Colten et al. | 73—103 X |
| 2,917,920 | 12/1959 | Robinette et al. | 73—95 |
| 3,140,601 | 7/1964 | Weyland et al. | 73—95 X |

FOREIGN PATENTS 902,787   12/1944   France.

OTHER REFERENCES

Kelsey, R. H., Krock, R. H., Microfiber Stress-Strain Apparatus, The Review of Scientific Instruments, vol. 36, #7, pages 1031–1034. Class 73–95.

Reichardt, C. H., Schaevitz, H., Dillon, J. H. Stress-Strain-Time Apparatus for Fiber Testing, Review of Scientific Instruments, vol. 20, No. 7, July 1949, pages 509–516.

March, D. M., Micro-Tensile Testing Machine, Journal of Scientific Instruments, vol. 38, June 1961, pages 229–234.

RICHARD C. QUEISSER, *Primary Examiner.*

JAMES H. WILLIAMSON, *Assistant Examiner.*